(12) United States Patent
Chen et al.

(10) Patent No.: US 11,790,533 B2
(45) Date of Patent: Oct. 17, 2023

(54) MACHINE LEARNING BASED IMAGE SEGMENTATION TRAINING WITH CONTOUR ACCURACY EVALUATION

(71) Applicants: Sony Group Corporation, Tokyo (JP); Sony Pictures Entertainment Inc., Culver City, CA (US)

(72) Inventors: Mengyu Chen, Santa Barbara, CA (US); Miaoqi Zhu, Studio City, CA (US); Yoshikazu Takashima, Los Angeles, CA (US); Ouyang Chao, Torrance, CA (US); Daniel De La Rosa, Los Angeles, CA (US); Michael Lafuente, Los Angeles, CA (US); Stephen Shapiro, Torrance, CA (US)

(73) Assignees: Sony Group Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 103 days.

(21) Appl. No.: 17/179,061

(22) Filed: Feb. 18, 2021

(65) Prior Publication Data
US 2022/0005200 A1 Jan. 6, 2022

Related U.S. Application Data

(60) Provisional application No. 63/047,750, filed on Jul. 2, 2020.

(51) Int. Cl.
*G06T 7/12* (2017.01)
*G06V 10/44* (2022.01)
(Continued)

(52) U.S. Cl.
CPC .............. *G06T 7/12* (2017.01); *G06F 18/214* (2023.01); *G06V 10/44* (2022.01); *G06V 10/774* (2022.01); *G06T 2207/10024* (2013.01)

(58) Field of Classification Search
None
See application file for complete search history.

(56) References Cited

U.S. PATENT DOCUMENTS

| 8,391,594 B1* | 3/2013 | Wang ................. G06T 7/143 |
| | | 382/199 |
| 2003/0115485 A1 | 6/2003 | Milliken |
| (Continued) | | |

FOREIGN PATENT DOCUMENTS

EP 3007411 A1 4/2016

OTHER PUBLICATIONS

Fernandez-Moral et al. "A new metric for evaluating semantic segmentation: leveraging global and contour accuracy", 2018 IEEE Intelligent Vehicles Symposium (IV) (Year: 2018).*

(Continued)

*Primary Examiner* — Randolph I Chu
(74) *Attorney, Agent, or Firm* — Procopio, Cory, Hargreaves & Savitch LLP

(57) ABSTRACT

Improving the accuracy of predicted segmentation masks, including: extracting a ground-truth RGB image buffer and a binary contour image buffer from a ground-truth RGB image container for segmentation training; generating predicted segmentation masks from the ground-truth RGB image buffer; generating second binary contours from the predicted segmentation masks using a particular algorithm; computing a segmentation loss between manually-segmented masks of the ground-truth RGB image buffer and the predicted segmentation masks; computing a contour accuracy loss between contours of the binary contour image buffer and the binary contours of the predicted segmentation masks; computing a total loss as a weighted average of the segmentation loss and the contour accuracy loss; and generating improved binary contours by compensating the contours of the binary contour image buffer with the computed (Continued)

total loss, wherein the improved binary contours are used to improve the accuracy of the predicted segmentation masks.

15 Claims, 7 Drawing Sheets
(4 of 7 Drawing Sheet(s) Filed in Color)

(51) Int. Cl.
*G06F 18/214* (2023.01)
*G06V 10/774* (2022.01)

(56) References Cited

U.S. PATENT DOCUMENTS

| | | |
|---|---|---|
| 2013/0151857 A1 | 6/2013 | Agrawal |
| 2016/0379683 A1 | 12/2016 | Sandrew et al. |
| 2017/0251014 A1 | 8/2017 | Eisen |
| 2017/0287137 A1* | 10/2017 | Lin .................. G06V 10/454 |
| 2017/0318297 A1 | 11/2017 | Puri et al. |
| 2018/0069837 A1* | 3/2018 | Graham-Cumming ............... H04L 67/56 |
| 2019/0057509 A1 | 2/2019 | Lv et al. |
| 2019/0206056 A1 | 7/2019 | Georgescu et al. |

OTHER PUBLICATIONS

Gupta et al. Learning Rich Features from RGB-D Images for Object Detection and Segmentation, arXiv:1407.5736v1 [cs.CV] Jul. 22, 2014. (Year: 2014).*
European Extended Search Report for application EU 19853217.8, counterpart to current case, dated Apr. 8, 2022, 12 pages.
International Search Report in PCT/US2021/035026, dated Sep. 2, 2021.
Written Opinion in PCT/US2021/035026, dated Sep. 2, 2021.
Voigtlaender et al., "FEELVOS: Fast End-to-End Embedding Learning for Video Object Segmentation", IEEE Conference on Computer Vision and Pattern Recognition (CVPR) (2019) arXiv: 1902.09513 [cs.CV], in 10 pages.
Wang et al., "A Learning-Based Automatic Segmentation and Quantifification Method on Left Ventricle in Gated Myocardial Perfusion SPECT Imaging: A Feasibility Study", Journal of Nuclear Cardiology (2019), in 45 pages.
Yang et al., "Automatic Brain Tumor Segmentation with Contour Aware Residual Network and Adversarial Training: 4th International Workshop, BrainLes 2018, Held in Conjunction with MICCAI 2018, Granada, Spain, Sep. 16, 2018, Revised Selected Papers, Part II", Brainlesion: Glioma, Multiple Sclerosis, Stroke and Traumatic Brain Injuries 2019:267-278), DOI: 10.1007/978-3-030-11726-9_24, in 14 pages.

* cited by examiner

MACHINE LEARNING BASED IMAGE SEGMENTATION TRAINING WITH CONTOUR ACCURACY EVALUATION

CROSS-REFERENCE TO RELATED APPLICATIONS

This application claims the benefit of priority under 35 U.S.C. § 119(e) of U.S. Provisional Patent Application No. 63/047,750, filed Jul. 2, 2020, entitled "Machine Learning based Image Segmentation Training with Contour Accuracy Evaluation." The disclosure of the above-referenced application is incorporated herein by reference.

BACKGROUND

Field

The present disclosure relates to segmentation masks, and more specifically, to improving the accuracy of predicted segmentation masks by evaluating the contour accuracy.

Background

Conventional machine learning (ML) based segmentation techniques using masks generate good enough results for non-professional media contents, such as low-resolution videos on social media. However, the quality of segmentation masks may not be high enough to meet the requirements of professional image/video processing tasks. For example, the edge clarity varies from frame to frame, which may cause incorrectly-inferred sub-pixels to appear in the masked areas. Those areas typically appear in the form of uncovered holes or discontinued contour along the edge. Thus, the ML-based segmentation techniques may fail to produce reliable and/or consistent segmentation masks in certain scenarios. These scenarios may include: high resolution images (e.g., HD, 4K); dynamic scenes, particularly those that have fast-moving objects; and color-graded contents (e.g., low brightness, similar texture in the foreground and background).

SUMMARY

The present disclosure provides for improving the accuracy of predicted segmentation masks by evaluating the contour accuracy.

In one implementation, a method for improving the accuracy of predicted segmentation masks is disclosed. The method includes: extracting a ground-truth red-green-blue (RGB) image buffer and a binary contour image buffer from a ground-truth RGB image container for segmentation training; generating predicted segmentation masks from the ground-truth RGB image buffer; generating second binary contours from the predicted segmentation masks using a particular algorithm; computing a segmentation loss between manually-segmented masks of the ground-truth RGB image buffer and the predicted segmentation masks; computing a contour accuracy loss between contours of the binary contour image buffer and the binary contours of the predicted segmentation masks; computing a total loss as a weighted average of the segmentation loss and the contour accuracy loss; and generating improved binary contours by compensating the contours of the binary contour image buffer with the computed total loss, wherein the improved binary contours are used to improve the accuracy of the predicted segmentation masks.

In one implementation, the method further includes: generating first binary contours based on the manually-segmented masks of the ground-truth RGB images using the particular algorithm; and intersecting the first binary contours into the ground-truth RGB images to produce the ground-truth RGB image container. In one implementation, intersecting the first binary contours into the ground-truth RGB images includes: placing each row of the ground-truth RGB images into first alternate rows of the ground-truth RGB image container; and placing each row of the first binary contours into second alternate rows of the ground-truth RGB image container. In one implementation, the first alternate rows are even row and the second alternate rows are odd rows. In one implementation, the manually-segmented masks are generated by manually segmenting the ground-truth RGB images. In one implementation, computing the total loss includes calculating the total loss as a first constant multiplied by the segmentation loss added to a second constant multiplied by the contour accuracy loss, wherein a sum of the first constant and the second constant is equal to 1.

In another implementation, a system for improving accuracy of predicted segmentation masks is disclosed. The system includes: a buffer extractor to extract a ground-truth RGB image buffer and a binary contour image buffer from an intersected image container; a segmentation network to receive the ground-truth RGB image buffer, the segmentation network to generate predicted segmentation masks; a processor to receive the predicted segmentation masks and to generate the predicted contours based on the predicted segmentation masks, the processor to compute a segmentation loss between manually-segmented masks and the predicted segmentation masks, the processor to also compute a contour accuracy loss between the predicted contours and the binary contour image buffer; and an enhancer to calculate a total loss as a weighted average of the segmentation loss and the contour accuracy loss.

In one implementation, the enhancer compensates for the loss in the binary contour image buffer using the total loss to produce improved binary contours, which are used to improve the accuracy of the predicted segmentation masks. In one implementation, the processor generates the predicted contours based on the predicted segmentation masks using a particular algorithm. In one implementation, the intersected image container is built by generating binary contours based on the manually-segmented masks of ground-truth RGB images in the ground-truth RGB image buffer using the particular algorithm, and intersecting binary contours in the binary contour image buffer into the ground-truth RGB images. In one implementation, the manually-segmented masks are generated by manually segmenting the ground-truth RGB images.

In yet another implementation, a non-transitory computer-readable storage medium storing a computer program to improve the accuracy of predicted segmentation masks is disclosed. The computer program includes executable instructions that cause a computer to: extract a ground-truth red-green-blue (RGB) image buffer and a binary contour image buffer from a ground-truth RGB image container for segmentation training; generate predicted segmentation masks from the ground-truth RGB image buffer; generate second binary contours from the predicted segmentation masks using a particular algorithm; compute a segmentation loss between manually-segmented masks of the ground-truth RGB image buffer and the predicted segmentation masks; compute a contour accuracy loss between contours of the binary contour image buffer and the binary contours of the predicted segmentation masks; compute a total loss as a weighted average of the segmentation loss and the contour accuracy loss; and generate improved binary contours by compensating the contours of the binary contour image buffer with the computed total loss, wherein the improved binary contours are used to improve the accuracy of the predicted segmentation masks.

In one implementation, the computer program further includes executable instructions that cause the computer to: generate first binary contours based on the manually-segmented masks of the ground-truth RGB images using the particular algorithm; and intersect the first binary contours into the ground-truth RGB images to produce the ground-truth RGB image container. In one implementation, the executable instructions that cause the computer to intersect the first binary contours into the ground-truth RGB images includes executable instructions that cause the computer to: place each row of the ground-truth RGB images into first alternate rows of the ground-truth RGB image container; and place each row of the first binary contours into second alternate rows of the ground-truth RGB image container. In one implementation, the first alternate rows are even row and the second alternate rows are odd rows. In one implementation, the manually-segmented masks are generated by manually segmenting the ground-truth RGB images. In one implementation, the executable instructions that cause the computer to compute the total loss includes executable instructions that cause the computer to calculate the total loss as a first constant multiplied by the segmentation loss added to a second constant multiplied by the contour accuracy loss, wherein a sum of the first constant and the second constant is equal to 1.

Other features and advantages should be apparent from the present description which illustrates, by way of example, aspects of the disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The details of the present disclosure, both as to its structure and operation, may be gleaned in part by study of the appended drawings, in which like reference numerals refer to like parts, and in which.

DETAILED DESCRIPTION

As described above, the conventional ML-based segmentation techniques may fail to produce reliable and/or consistent segmentation masks in scenarios involving high resolution images, dynamic scenes including fast-moving objects, and/or color-graded contents.

Certain implementations of the present disclosure provide methods and systems for improving the accuracy of predicted segmentation masks by evaluating the contour accuracy (especially along the edge) and by using an image reformatting technique known as "buffer intersection."

After reading the below descriptions, it will become apparent how to implement the disclosure in various implementations and applications. Although various implementations of the present disclosure will be described herein, it is understood that these implementations are presented by way of example only, and not limitation. As such, the detailed description of various implementations should not be construed to limit the scope or breadth of the present disclosure.

In one implementation, to improve the accuracy of predicted segmented mask along the edge, following steps may be taken: (a) select a particular algorithm that generates binary contours based on manually-segmented masks of ground-truth red-green-blue (RGB) images; (b) generate a new set of ground-truth images by intersecting binary contour buffer into the original RGB images; (c) extract ground-truth RGB image buffer from an augmented training set for segmentation training; (d) use the particular algorithm to obtain binary contours based on the predicted segmentation mask; (e) compute the difference in the form of a loss function between contour of the manually-segmented masks of the ground-truth RGB images and contour of the predicted segmentation masks; and (f) add the contour loss to the segmentation loss for backpropagation.

Figure 1:
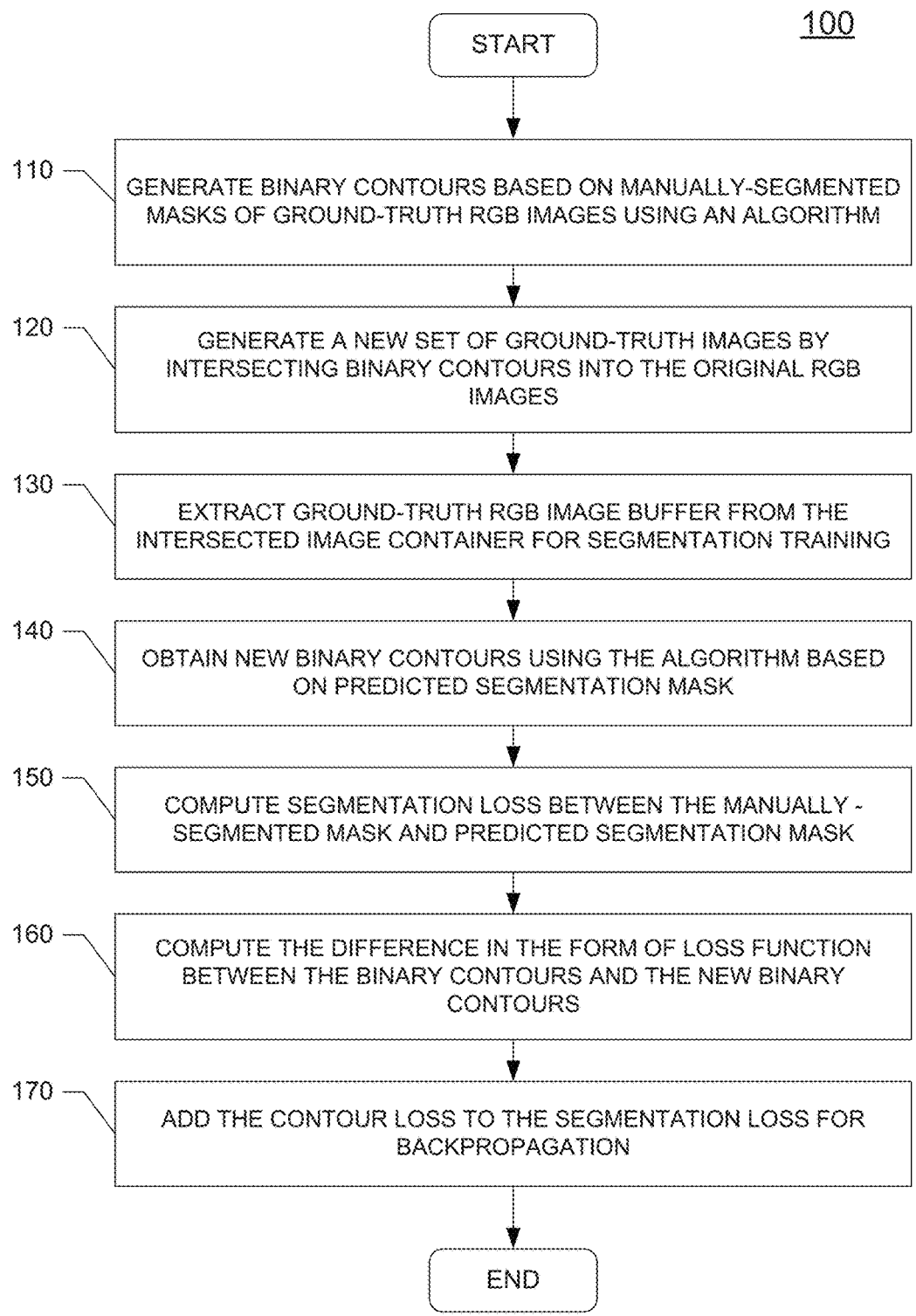
FIG. 1 is a flow diagram of a method for improving the accuracy of predicted segmentation masks in accordance with one implementation of the present disclosure.

FIG. 1 is a flow diagram of a method 100 for improving the accuracy of predicted segmentation masks in accordance with one implementation of the present disclosure. In one implementation, the accuracy of the predicted segmentation masks along the edge is improved by evaluating the contour accuracy and by using an image reformatting technique known as "buffer intersection."

In the illustrated implementation of FIG. 1, a boundary tracing algorithm is selected, at step 110, that generates binary contours based on manually-segmented masks of a first set of ground-truth red-green-blue (RGB) images. In one implementation, the particular algorithms to choose from, which are conventional or machine-learning based, include square tracing algorithm, Moore-neighbor tracing algorithm, and radial sweep. In another implementation, the particular algorithms include boundary tracing algorithms such as OpenCV function. An RGB image is a true color image that defines red, green, and blue color components for each individual pixel.

Figure 2:
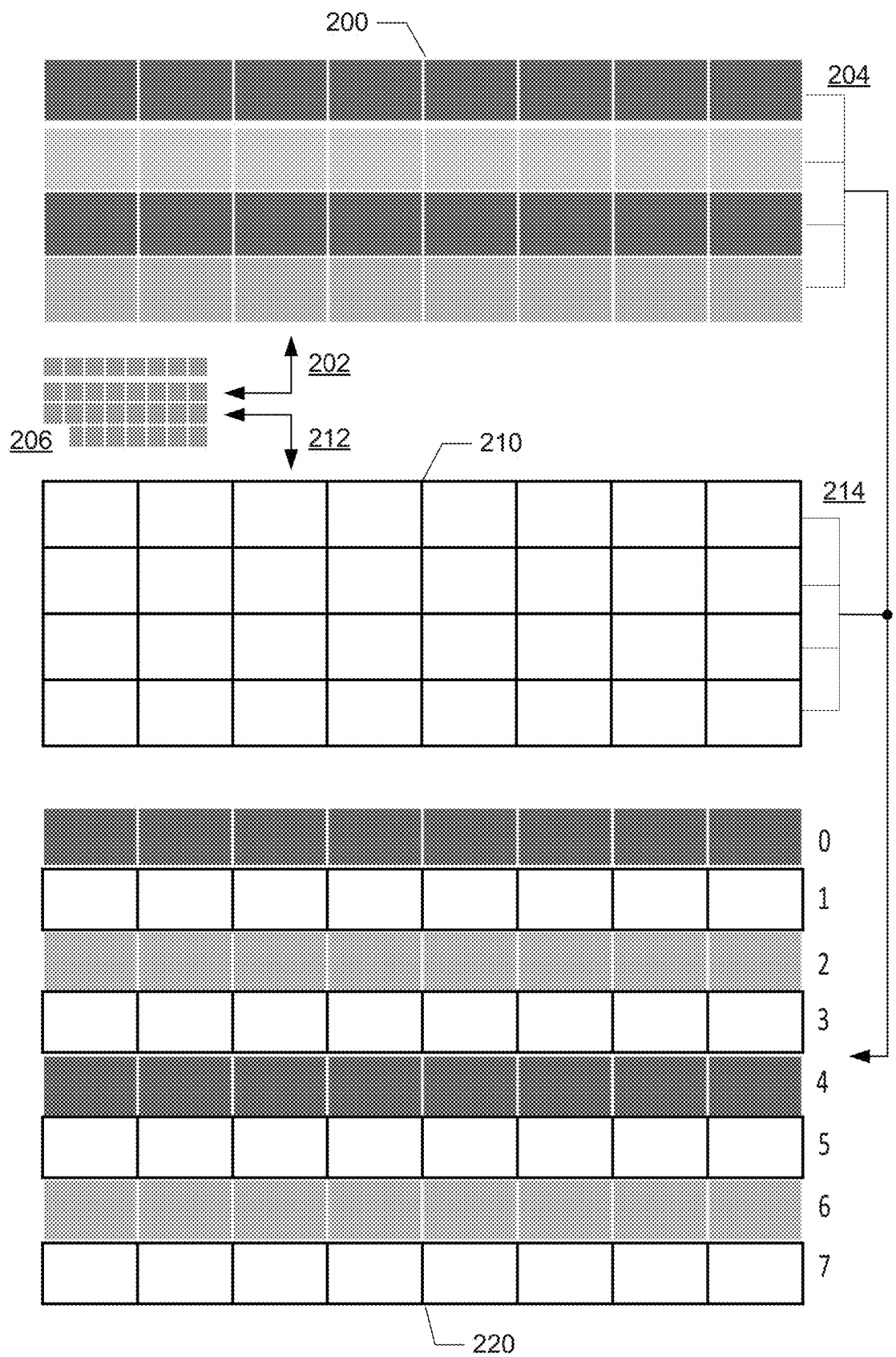
FIG. 2 shows the ground-truth RGB images and the binary contour image.

FIG. 2 shows the ground-truth RGB images 200 and the binary contour image 210. The manual segmentation (see arrow 202) of the ground-truth RGB images 200 (e.g., saved in a first buffer) is performed to generate the manually-segmented masks 206, while the contour detection and generation (see arrow 212) is performed to generate the binary contour image 210 (e.g., saved in a second buffer) based on the manually-segmented masks.

Returning to the illustrated implementation of FIG. 1, a second set of ground-truth RGB images is generated, at step 120, by intersecting the contours of the binary contour image 210 into the ground-truth RGB images 200 to save the second set of ground-truth RGB images into one image container. That is, each row of the ground-truth RGB images is placed into first alternate rows of the ground-truth RGB image container, while each row of the first binary contours placed into second alternate rows of the ground-truth RGB image container.

FIG. 2 shows one implementation of the process of intersecting the contours of the binary contour image 210 into the ground-truth RGB images 200. In the illustrated implementation of FIG. 2, each row 204 of the ground-truth RGB images 200 (in the first buffer, for example) is placed into the even rows (e.g., rows 0, 2, 4, 6, etc.) of the image container 220, while each row 214 of the binary contour image 210 (in the second buffer, for example) is placed into the odd rows (e.g., rows 1, 3, 5, 7, etc.) of the image container 220. In other implementations, different configurations can be used to intersect or combine the ground-truth RGB images 200 and the binary contour image 210, such as by interchanging the rows with columns or by interchanging the odd and even rows or columns. In column configurations, it should be noted that the image buffer is transposed from row-based to column-based.

Figure 3A:
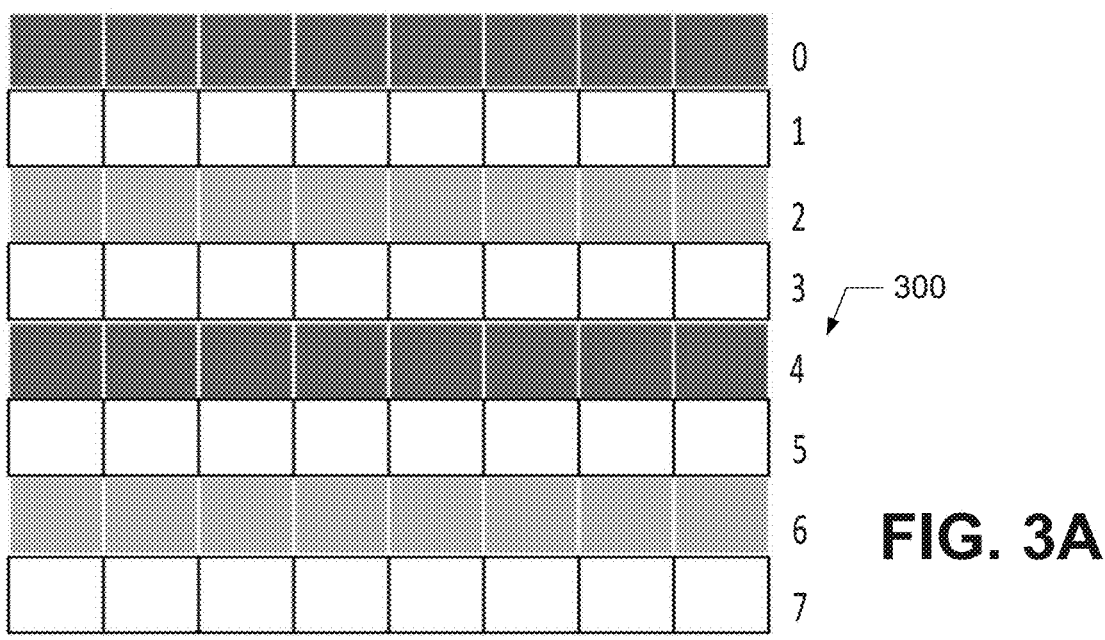
FIG. 3A shows the second set of ground-truth RGB images saved into an image buffer.
Figure 3B:
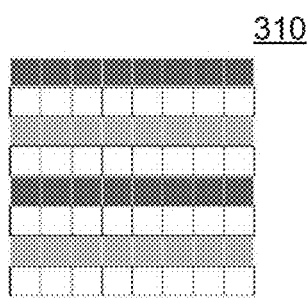
FIG. 3B shows the scaling of the image.
Figure 3C:
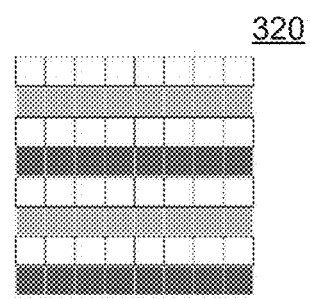
FIG. 3C shows the rotation of the image.
Figure 3D:
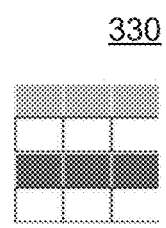
FIG. 3D shows the cropping of the image.
Figure 3E:
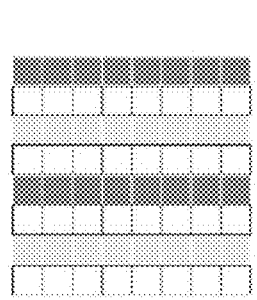
FIG. 3E shows the brightness control of the image.

FIGS. 3A through 3E are illustrated to show the benefit of generating the second set of ground-truth RGB images (including both the ground-truth RGB images and the binary contour image) and saving the images into one image container. The advantage of hosting two or more buffers in one image container enables the pixels to be unaffected by image augmentations during the training. Thus, by having both the ground-truth RGB image buffer and the binary contour image buffer in one image container, pixels of the image can be substantially evenly processed (e.g., scaling, rotating, cropping, brightness control, etc.) with the user's choices of image augmentation(s). Therefore, the RGB buffer for the training will have the correct format and code values as intended. Meanwhile, the binary contour can stay untouched, as the user can choose to which buffer to apply augmentation(s). FIG. 3A shows the second set of ground-truth RGB images 300 saved into an image buffer. FIG. 3B shows the scaling 310 of the image. FIG. 3C shows the rotation 320 of the image. FIG. 3D shows the cropping 330 of the image. FIG. 3E shows the brightness control 340 of the image.

Figure 4:
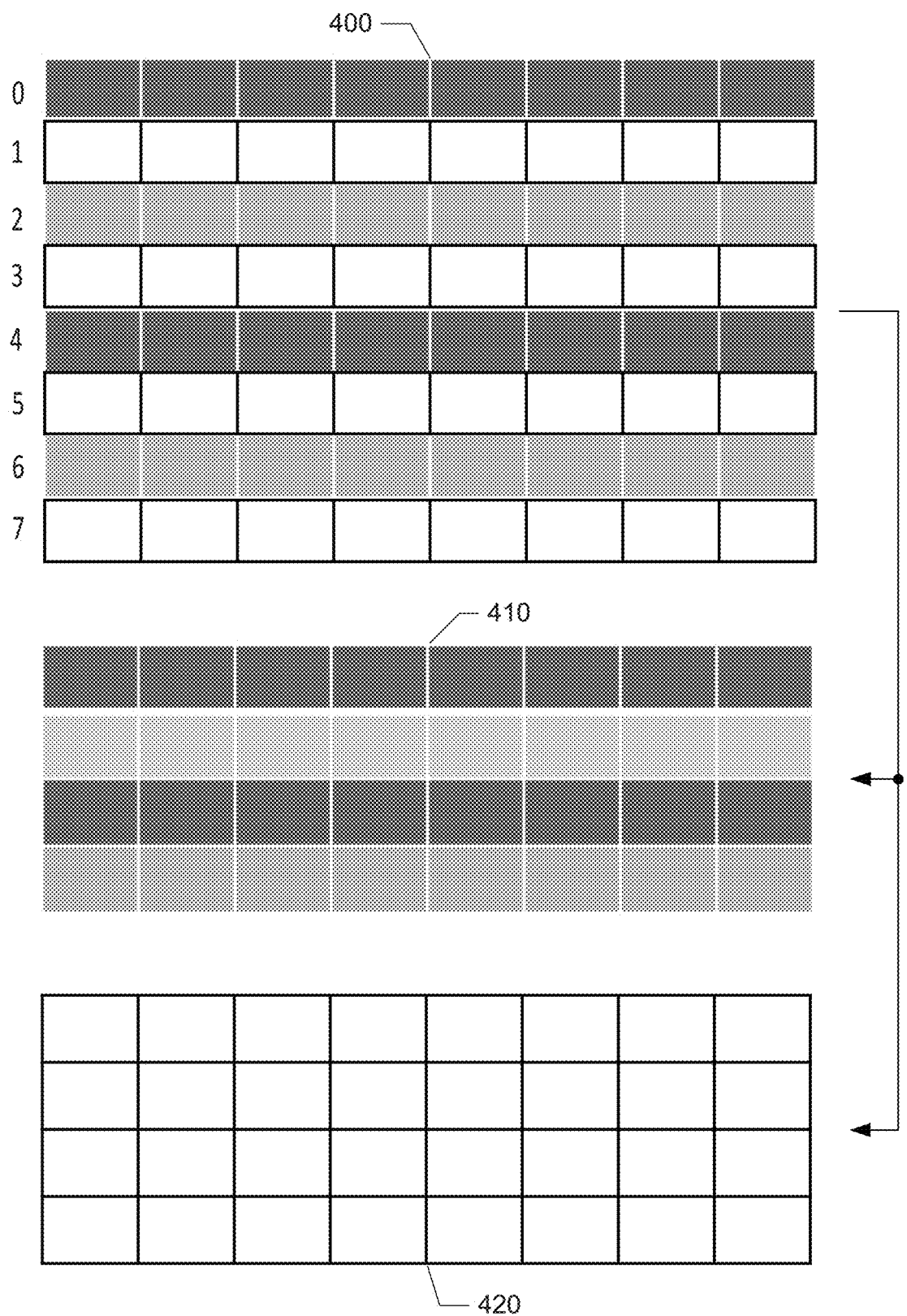
FIG. 4 shows the augmented training set along with the extracted ground-truth RGB image buffer and the binary contour image.

Returning to the illustrated implementation of FIG. 1, the ground-truth RGB image buffer is extracted (the extraction step), at step 130, from an intersected image container for segmentation training, which produces a predicted segmentation mask. The binary contours are generated (the binary contour generation step), at step 140, based on the predicted segmentation mask using the same algorithm used in step 110. A segmentation loss is then computed (the segmentation loss computation step), at step 150, between the manually-segmented mask and the predicted segmentation mask. It should be noted that the ground-truth segmentation mask is better than the predicted segmentation mask. FIG. 4 shows the augmented training set 400 along with the extracted ground-truth RGB image buffer 410 and the binary contour image 420.

In the illustrated implementation of FIG. 1, the difference in the form of a loss function between the contours of the manually-segmented masks of the ground-truth RGB images and the contours of the predicted segmentation masks is computed (the contour accuracy loss computation step), at step 160. The difference (contour accuracy loss) is then added to the segmentation loss, at step 170, to generate the ground-truth contour for the backward propagation of errors.

Figure 5:
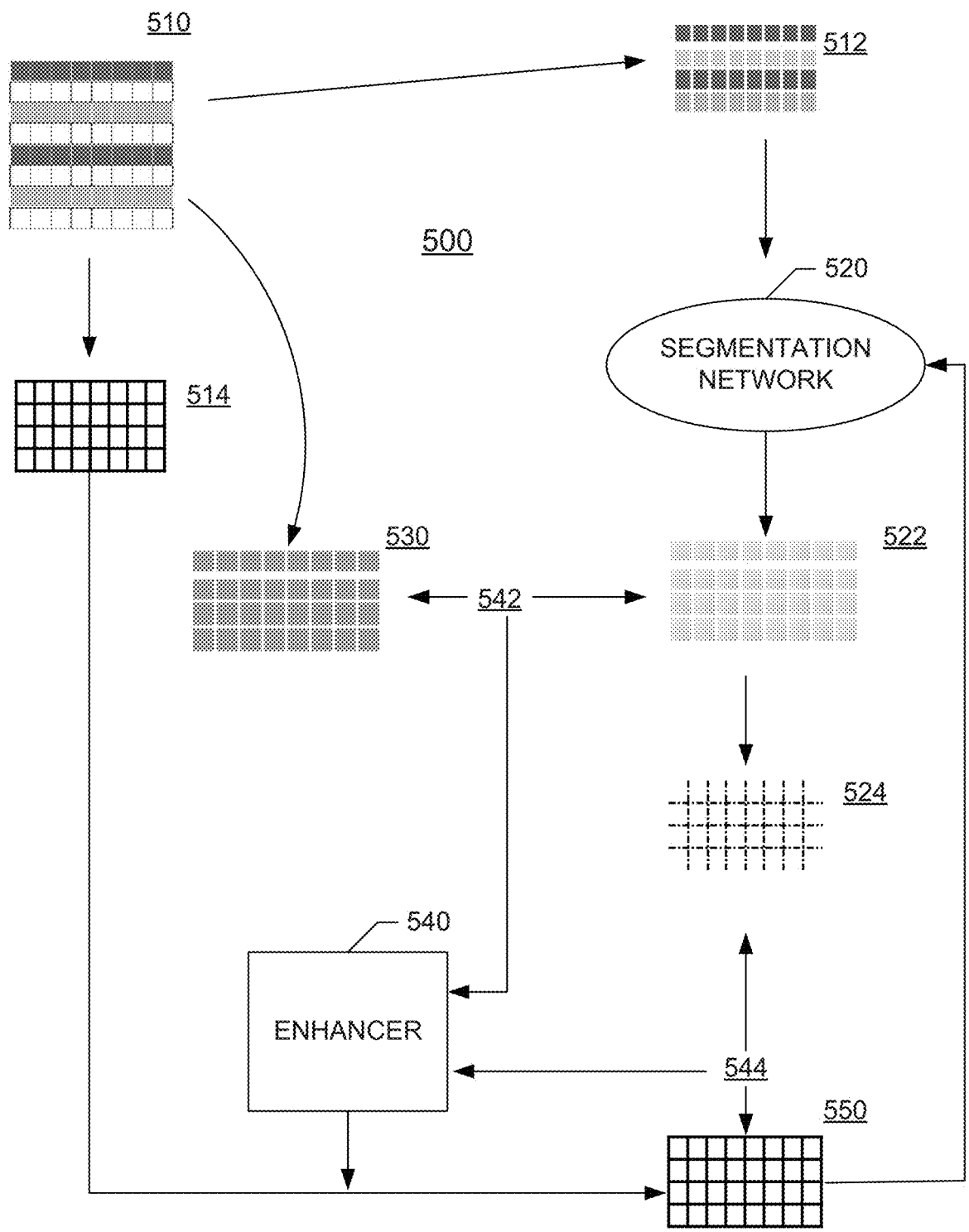
FIG. 5 illustrates a process for improving the accuracy of predicted segmentation masks by evaluating the contour accuracy in accordance with one implementation of the present disclosure.

FIG. 5 illustrates a process 500 for improving the accuracy of predicted segmentation masks by evaluating the contour accuracy in accordance with one implementation of the present disclosure. The process includes the extraction step, binary contour generation step, the segmentation loss computation step, the contour accuracy loss computation step, and the ground-truth contour generation step.

In the illustrated implementation of FIG. 5, a ground-truth RGB image buffer 512 and a binary contour image buffer 514 are extracted from the augmented training set 510. The ground-truth RGB image buffer 512 is input to the segmentation network 520 to produce predicted segmentation masks 522. The predicted contours 524 are then generated from the predicted segmentation masks 522. A segmentation loss 542 is also computed between the manually-segmented masks 530 and the predicted segmentation masks 522.

In the illustrated implementation of FIG. 5, an enhancer 540 receives the segmentation loss 542 and the contour accuracy loss 544 and calculates a total loss as a weighted average of the segmentation loss 542 and the contour accuracy loss 544 (i.e., Total Loss=k*segmentation loss+ (1−k)*contour accuracy loss). In one implementation, the enhancer 540 compensates for the loss in the binary contour image buffer 514 using the total loss calculation to produce the improved binary contours 550. The enhancer 540 then utilizes the improved binary contours 550 to assist the optimization process of the segmentation network 520 to improve the accuracy of the predicted segmentation masks. Thus, the enhancer 540 is configured to train both the contour accuracy network (using the existing contour generation model) and the segmentation network (through the use of the trained contour accuracy network).

Figure 6:
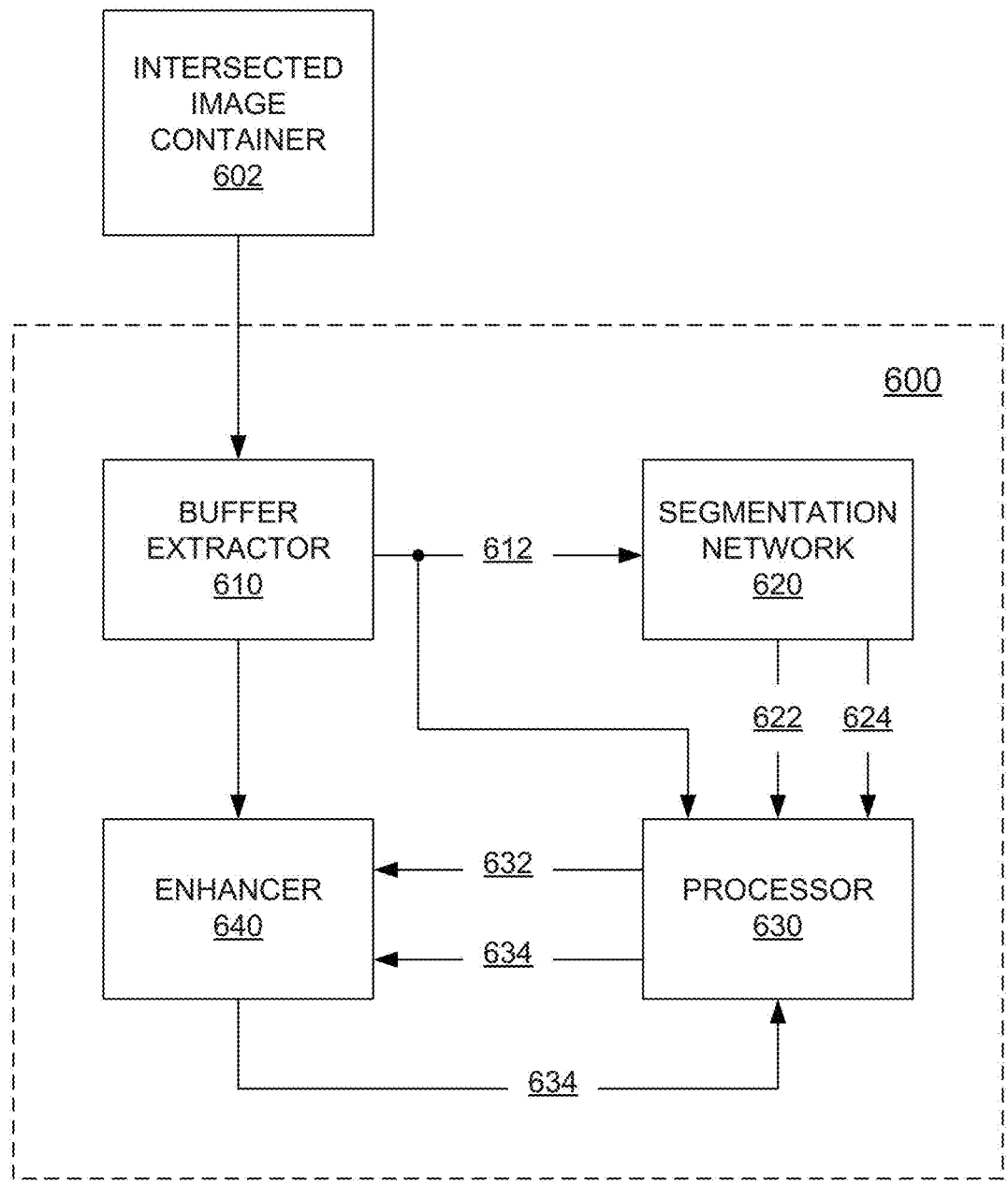
FIG. 6 is a block diagram of a system for improving the accuracy of predicted segmentation masks in accordance with one implementation of the present disclosure.

FIG. 6 is a block diagram of a system 600 for improving the accuracy of predicted segmentation masks in accordance with one implementation of the present disclosure. In the illustrated implementation of FIG. 6, the system 600 includes a buffer extractor 610, a segmentation network 620, a processor 630, and an enhancer 640. In one implementation, the blocks 610, 620, 630, 640 of the system 600 are configured entirely with hardware including one or more digital signal processors (DSPs), general purpose microprocessors, application specific integrated circuits (ASICs), field programmable logic arrays (FPGAs), or other equivalent integrated or discrete logic circuitry.

In the illustrated implementation of FIG. 6, the buffer extractor 610 extracts a ground-truth RGB image buffer and a binary contour image buffer from the intersected image container 602. The segmentation network 620 receives the ground-truth RGB image buffer and generates predicted segmentation masks. The processor 630 then receives the predicted segmentation masks and generates the predicted contours based on the predicted segmentation masks using the same algorithm that was used to generate the binary contours from the manually-segmented masks. The processor 630 also computes a segmentation loss between the manually-segmented masks and the predicted segmentation masks and sends the computed segmentation loss to the enhancer 640. The processor 630 further computes a contour accuracy loss between the predicted contours 524 and the binary contours of the image buffer.

In the illustrated implementation of FIG. 6, the enhancer 640 receives the segmentation loss 542 and the contour accuracy loss 544 and calculates a total loss as a weighted average of the segmentation loss 542 and the contour accuracy loss 544 (i.e., Total Loss=k*segmentation loss+ (1−k)*contour accuracy loss). The enhancer 640 compensates for the loss in the binary contour image buffer using the total loss calculation to produce the improved binary contours. The improved binary contours are then used to assist the segmentation network 620 to produce better segmentation masks.

Figure 7A:
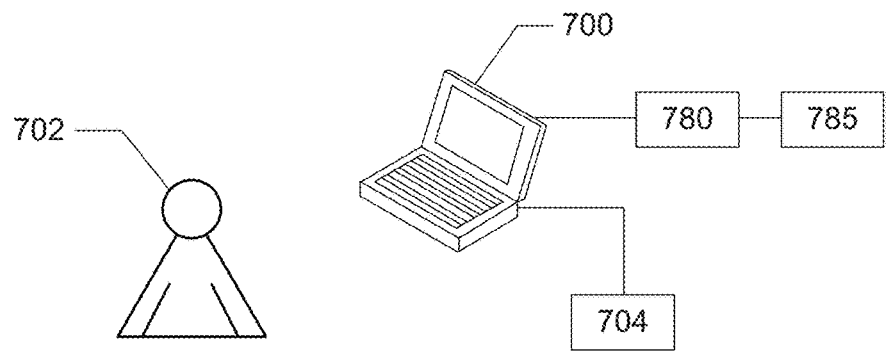
FIG. 7A is a representation of a computer system and a user in accordance with an implementation of the present disclosure.

FIG. 7A is a representation of a computer system 700 and a user 702 in accordance with an implementation of the present disclosure. The user 702 uses the computer system 700 to implement an image processing application 790 for improving the accuracy of predicted segmentation masks with respect to the method 100 of FIG. 1 and the system 600 of FIG. 6.

Figure 7B:
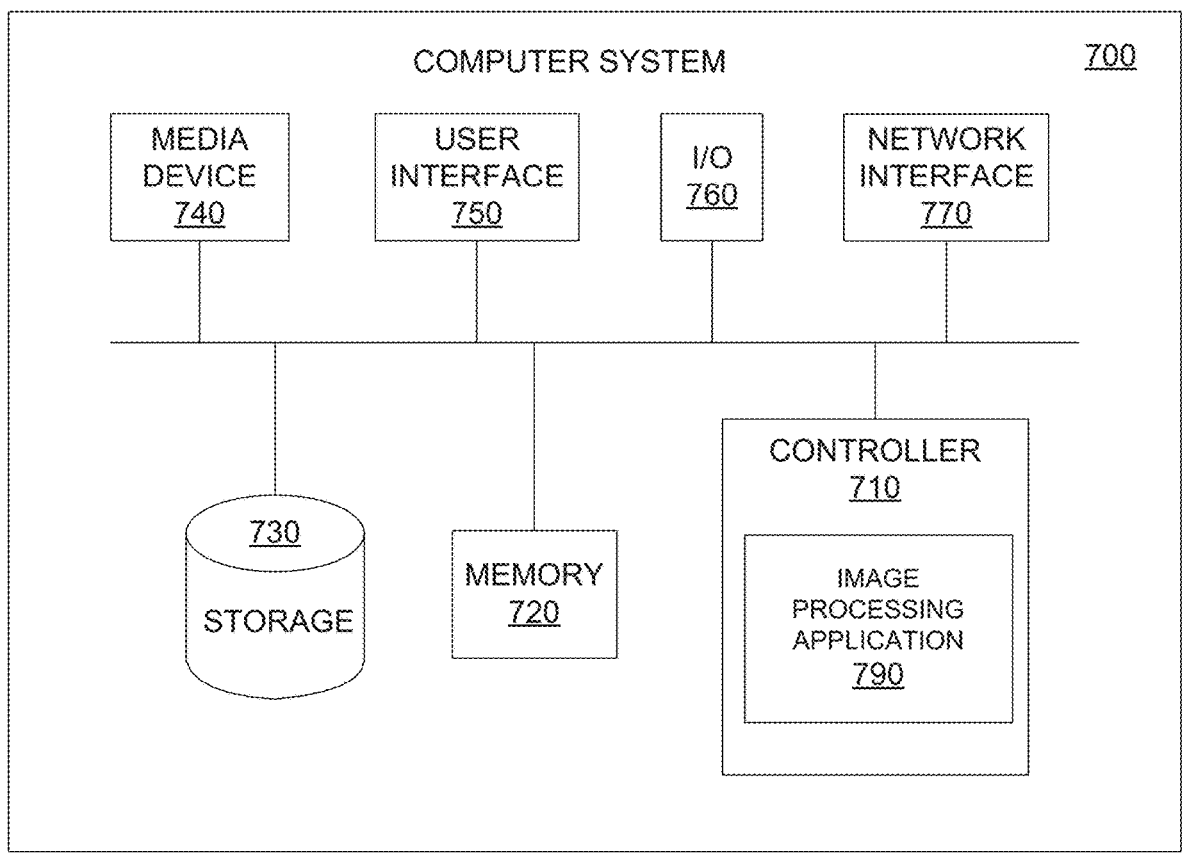
FIG. 7B is a functional block diagram illustrating the computer system hosting an image processing application in accordance with an implementation of the present disclosure.

The computer system 700 stores and executes the image processing application 790 of FIG. 7B. In addition, the computer system 700 may be in communication with a software program 704. Software program 704 may include the software code for the image processing application 790. Software program 704 may be loaded on an external medium such as a CD, DVD, or a storage drive, as will be explained further below.

Furthermore, computer system 700 may be connected to a network 780. The network 780 can be connected in various different architectures, for example, client-server architecture, a Peer-to-Peer network architecture, or other type of architectures. For example, network 780 can be in communication with a server 785 that coordinates engines and data used within the image processing application 790. Also, the network can be different types of networks. For example, the network 780 can be the Internet, a Local Area Network or any variations of Local Area Network, a Wide Area Network, a Metropolitan Area Network, an Intranet or Extranet, or a wireless network.

FIG. 7B is a functional block diagram illustrating the computer system 700 hosting the image processing application 790 in accordance with an implementation of the present disclosure. A controller 710 is a programmable processor and controls the operation of the computer system 700 and its components. The controller 710 loads instructions (e.g., in the form of a computer program) from the memory 720 or an embedded controller memory (not shown) and executes these instructions to control the system. In its execution, the controller 710 provides the image processing application 790 with a software system, such as to enable generation of predicted segmentation masks with improved accuracy. Alternatively, this service can be implemented as separate hardware components in the controller 710 or the computer system 700.

Memory 720 stores data temporarily for use by the other components of the computer system 700. In one implementation, memory 720 is implemented as RAM. In another implementation, memory 720 also includes long-term or permanent memory, such as flash memory and/or ROM.

Storage 730 stores data either temporarily or for long periods of time for use by the other components of the computer system 700. For example, storage 730 stores data used by the image processing application 790. In one implementation, storage 730 is a hard disk drive.

The media device 740 receives removable media and reads and/or writes data to the inserted media. In one example, the media device 740 is an optical disc drive.

The user interface 750 includes components for accepting user input from the user of the computer system 700 and presenting information to the user 702. In one implementation, the user interface 750 includes a keyboard, a mouse, audio speakers, and a display. The controller 710 uses input from the user 702 to adjust the operation of the computer system 700.

The I/O interface 760 includes one or more I/O ports to connect to corresponding I/O devices, such as external storage or supplemental devices (e.g., a printer or a PDA). In one implementation, the ports of the I/O interface 760 include ports such as: USB ports, PCMCIA ports, serial ports, and/or parallel ports. In another implementation, the I/O interface 760 includes a wireless interface for communication with external devices wirelessly.

The network interface 770 includes a wired and/or wireless network connection, such as an RJ-45 or "Wi-Fi" interface (including, but not limited to 802.11) supporting an Ethernet connection.

The computer system 700 includes additional hardware and software typical of computer systems (e.g., power, cooling, operating system), though these components are not specifically shown in FIG. 7B for simplicity. In other implementations, different configurations of the computer system can be used (e.g., different bus or storage configurations or a multi-processor configuration).

The description herein of the disclosed implementations is provided to enable any person skilled in the art to make or use the present disclosure. Numerous modifications to these implementations would be readily apparent to those skilled in the art, and the principles defined herein can be applied to other implementations without departing from the spirit or scope of the present disclosure. Thus, the present disclosure is not intended to be limited to the implementations shown herein but is to be accorded the widest scope consistent with the principal and novel features disclosed herein.

Accordingly, additional variations and implementations are also possible. For example, one implementation adds contour image-based evaluation into image segmentation model machine learning training, to improve the performance of image segmentation process. Contour image-based evaluation improves efficiency of video segmentation model training, by providing another reference information, whether segmentation by the model in training is providing output consistent to the contour image. Examples of additional implementations include: removing the need to use green screen in content creation; and image segmentation and shape recognition for robotics, autonomous driving, factory automation, etc.

Higher fidelity video segmentation engine trained with proposed solution can be used to automate actor and object masking process in the visual effects (VFX) process of content creation. Such masking is currently done manually by human, and the time-consuming process can be automated by using machine learning based tool.

All features of each of the above-discussed examples are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A method for improving the accuracy of predicted segmentation masks, the method comprising:
   extracting a ground-truth red-green-blue (RGB) image buffer and a binary contour image buffer from a ground-truth RGB image container for segmentation training;
   generating predicted segmentation masks from the ground-truth RGB image buffer;
   generating second binary contours from the predicted segmentation masks using a particular algorithm;
   computing a segmentation loss between manually-segmented masks of the ground-truth RGB image buffer and the predicted segmentation masks;
   computing a contour accuracy loss between contours of the binary contour image buffer and the second binary contours of the predicted segmentation masks;
   computing a total loss as a weighted average of the segmentation loss and the contour accuracy loss; and
   generating improved binary contours by compensating the contours of the binary contour image buffer with the computed total loss, wherein the improved binary contours are used to improve the accuracy of the predicted segmentation masks.

2. The method of claim 1, further comprising:
   generating first binary contours based on the manually-segmented masks of the ground-truth RGB images using the particular algorithm; and
   intersecting the first binary contours into the ground-truth RGB images to produce the ground-truth RGB image container.

3. The method of claim 2, wherein intersecting the first binary contours into the ground-truth RGB images comprises:
   placing each row of the ground-truth RGB images into first alternate rows of the ground-truth RGB image container; and
   placing each row of the first binary contours into second alternate rows of the ground-truth RGB image container.

4. The method of claim 3, wherein the first alternate rows are even rows and the second alternate rows are odd rows.

5. The method of claim 1, wherein the manually-segmented masks are generated by manually segmenting the ground-truth RGB images.

6. The method of claim 1, wherein computing the total loss comprises:
   calculating the total loss as a first constant multiplied by the segmentation loss added to a second constant multiplied by the contour accuracy loss,
   wherein a sum of the first constant and the second constant is equal to 1.

7. A system for improving accuracy of predicted segmentation masks, the system comprising:
   a buffer extractor to extract a ground-truth RGB image buffer and a binary contour image buffer from an intersected image container for segmentation training;
   a segmentation network to receive the ground-truth RGB image buffer, the segmentation network to generate predicted segmentation masks;
   a processor to receive the predicted segmentation masks and to generate second binary contours from the predicted segmentation masks using a particular algorithm, the processor to compute a segmentation loss between manually-segmented masks of the ground-truth RGB image buffer and the predicted segmentation masks, the processor to also compute a contour accuracy loss between contours of the binary contour image buffer and the second binary contours of the predicted segmentation masks; and
   an enhancer to calculate a total loss as a weighted average of the segmentation loss and the contour accuracy loss, and to generate improved binary contours by compensating the contours of the binary contour image buffer with the computed total loss, wherein the improved binary contours are used to improve the accuracy of the predicted segmentation masks.

8. The system of claim 7, wherein the intersected image container is built by generating the second binary contours based on the manually-segmented masks of ground-truth RGB images in the ground-truth RGB image buffer using the particular algorithm, and intersecting binary contours in the binary contour image buffer into the ground-truth RGB images.

9. The system of claim 8, wherein the manually-segmented masks are generated by manually segmenting the ground-truth RGB images.

10. A non-transitory computer-readable storage medium storing a computer program to improve the accuracy of predicted segmentation masks, the computer program comprising executable instructions that cause a computer to:
    extract a ground-truth red-green-blue (RGB) image buffer and a binary contour image buffer from a ground-truth RGB image container for segmentation training;
    generate predicted segmentation masks from the ground-truth RGB image buffer;
    generate second binary contours from the predicted segmentation masks using a particular algorithm;
    compute a segmentation loss between manually-segmented masks of the ground-truth RGB image buffer and the predicted segmentation masks;
    compute a contour accuracy loss between contours of the binary contour image buffer and the second binary contours of the predicted segmentation masks;
    compute a total loss as a weighted average of the segmentation loss and the contour accuracy loss; and
    generate improved binary contours by compensating the contours of the binary contour image buffer with the computed total loss, wherein the improved binary contours are used to improve the accuracy of the predicted segmentation masks.

11. The non-transitory computer-readable storage medium of claim 10, the computer program further comprising executable instructions that cause the computer to:
    generate first binary contours based on the manually-segmented masks of the ground-truth RGB images using the particular algorithm; and
    intersect the first binary contours into the ground-truth RGB images to produce the ground-truth RGB image container.

12. The non-transitory computer-readable storage medium of claim 11, wherein the executable instructions that cause the computer to intersect the first binary contours into the ground-truth RGB images comprises executable instructions that cause the computer to:
    place each row of the ground-truth RGB images into first alternate rows of the ground-truth RGB image container; and
    place each row of the first binary contours into second alternate rows of the ground-truth RGB image container.

13. The non-transitory computer-readable storage medium of claim 12, wherein the first alternate rows are even rows and the second alternate rows are odd rows.

14. The non-transitory computer-readable storage medium of claim 10, wherein the manually-segmented masks are generated by manually segmenting the ground-truth RGB images.

15. The non-transitory computer-readable storage medium of claim 10, wherein the executable instructions that cause the computer to compute the total loss comprises executable instructions that cause the computer to:
calculate the total loss as a first constant multiplied by the segmentation loss added to a second constant multiplied by the contour accuracy loss,
wherein a sum of the first constant and the second constant is equal to 1.

* * * * *